United States Patent
Thomas et al.

(10) Patent No.: US 6,510,308 B1
(45) Date of Patent: Jan. 21, 2003

(54) RECEPTION OF WEAK RADIO FREQUENCY SIGNAL IN THE PRESENCE OF A STRONG INTERNAL RADIO FREQUENCY INTERFERER—DEVICE AND METHOD FOR COMPENSATION OF AN INTERNAL INTERFERING SIGNAL BY A SUPERPOSITION METHOD

(75) Inventors: Harald Thomas, Franz-Liszt-Strasse (DE); Walter Kodim, Fenitzerstrasse (DE); Roman Gloeckler, Birkenstrasse (DE); Herbert Dingfelder, Minnesängerstrasse (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 59 days.

(21) Appl. No.: 09/630,008

(22) Filed: Jul. 31, 2000

(30) Foreign Application Priority Data

Aug. 24, 1999 (EP) .............................. 99116184

(51) Int. Cl.⁷ .............................. H04B 1/10; H04B 15/00
(52) U.S. Cl. .................. 455/63; 455/67.3; 455/456; 455/24
(58) Field of Search .............................. 455/24, 78, 63, 455/1–3, 25, 501, 66, 67.3, 101, 456, 67.1, 457

(56) References Cited

U.S. PATENT DOCUMENTS

| | | | |
|---|---|---|---|
| 4,952,193 A | * 8/1990 | Talwar | 455/63 |
| 5,691,978 A | * 11/1997 | Kenworthy | 370/278 |
| 5,781,845 A | * 7/1998 | Dybdal et al. | 455/65 |
| 5,815,805 A | * 9/1998 | Crnkovic et al. | 455/78 |
| 5,835,848 A | * 11/1998 | Bi et al. | 455/24 |
| 5,852,767 A | * 12/1998 | Sugita | 455/63 |
| 6,011,952 A | * 1/2000 | Dankberg et al. | 455/24 |
| 6,154,634 A | * 11/2000 | Broux | 455/24 |
| 6,229,992 B1 | * 5/2001 | McGeehan et al. | 455/78 |
| 6,311,045 B1 | * 10/2001 | Domokos | 455/78 |

FOREIGN PATENT DOCUMENTS

| | | |
|---|---|---|
| WO | 96/15596 A | 5/1996 |
| WO | 99/36795 A | 7/1999 |

* cited by examiner

Primary Examiner—Edward F. Urban
Assistant Examiner—Charles Craver
(74) Attorney, Agent, or Firm—Nixon & Vanderhye, P.C.

(57) ABSTRACT

The invention compensates for any interference from a mobile communication unit to a positioning receiver unit in a multiple standard communication device with mobile communication and localization functionality. A first sub-unit receives input signals at a predetermined input level. A second sub-unit transmits output signals at an output level that is large compared to the input level of the first sub-unit. A branch-off unit branches off a part of the output signal before the antenna of the second sub-unit. An interference suppression unit receives the branch-off part of the output signal and derives an interference compensation signal therefrom through attenuation and subsequent phase shifting. The interference compensation signal is supplied to a superposition unit that also receives the input signal of the first sub-unit.

8 Claims, 6 Drawing Sheets

RECEPTION OF WEAK RADIO FREQUENCY SIGNAL IN THE PRESENCE OF A STRONG INTERNAL RADIO FREQUENCY INTERFERER— DEVICE AND METHOD FOR COMPENSATION OF AN INTERNAL INTERFERING SIGNAL BY A SUPERPOSITION METHOD

FIELD OF INVENTION

The present invention relates to the reception of a weak radio frequency (RF) signal in the presence of a strong internal RF interferer, and in particular to the cancellation of internal interfering signals by a superposition method.

BACKGROUND ART

Currently, there exists an increasing need for the users of mobile phones to receive information about the exact geographical position. Therefore, it has been proposed to add a positioning system receiver unit to a mobile phone unit to localize the position of the mobile phone.

Here, the positioning system receiver is adapted, e.g., to the Global Positioning System (GPS) standard, in operation during the entire operation time of the mobile phone to ensure high accuracy and fast update of the positioning procedure. Further, the mobile phone unit itself consists of a receiver part and a transmitter part both being connected to an antenna. In case a call is established, the mobile phone unit starts to transmit a RF signal at a dedicated frequency and at well defined time slots, e.g., according to the TDMA/FDMA transmission scheme defined for the GSM standard.

During transmission the transmitter in the mobile phone unit uses at least a single time slot per frame but it is also planned to use a plurality of time slots to send data in the future. This means, in an extreme case the mobile phone is transmitting continuously.

While up to now the positioning system receiver unit and the mobile phone unit are implemented into physically separated devices there is the tendency to bring the positioning system receiver unit and the mobile phone unit together.

However, if the positioning system receiver unit and the mobile phone unit are integrated in a multiple standard communication device, e.g., through attaching the positioning system receiver unit to the mobile phone unit with a dedicated connector or even by building the positioning system receiver unit into the housing of the mobile phone unit additional problems arise due to the decreased distance between both functional units.

Figure 1:
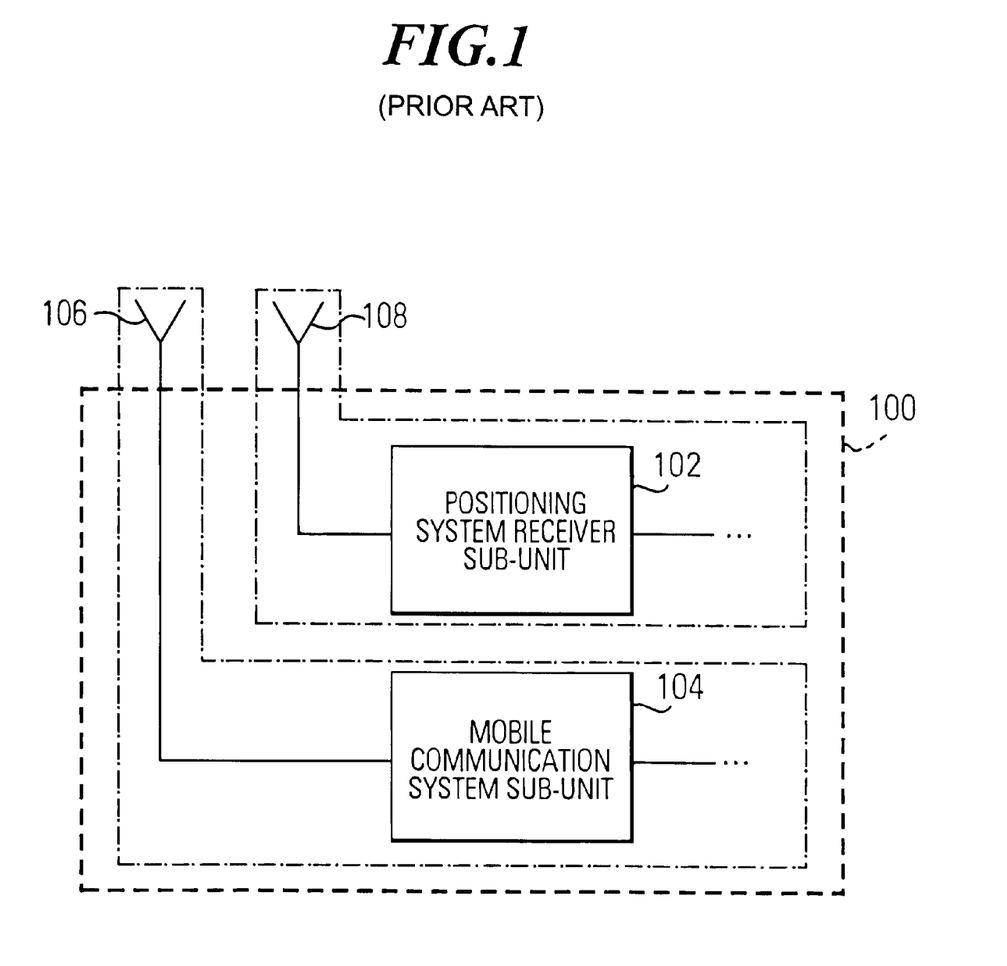
FIG. 1 shows a schematic diagram for a state of the art mobile dual standard communication device comprising a positioning system receiver unit and a mobile communication system unit, respectively.

FIG. 1 shows a schematic diagram for a multiple standard communication device 100 having multiple functional units using different standards. Typically, the multiple standard communication device comprises at least two sub-units 102 and 104 each having an antenna 106 and 108, respectively. As outlined above, for such a multiple standard communication device, e.g., one sub-unit is a dedicated positioning system receiver unit in the group of GPS, Glonass, EGNOS, WAAS, etc., and the other sub-unit is a mobile communication system unit in the group of GSM900, GSM1800, GSM1900, AMPS, DAMPS, PDC, CDMA, etc.

Here, the transmission signal generated by the mobile communication unit 104 disturbs the functionality of the positioning system receiver unit 102 in the communication device 100. The reason herefor is that an antenna 106 of the mobile phone 104 and an antenna 108 of the positioning system receiver 102 are located close to each other due to the small dimensions of the communication device 100. Therefore, the isolation between both antennas 106 and 108 is limited to a certain value, e.g., lying in the range of 30 to 40 dB.

Since the output power of the mobile phone 104 may reach 33 dBm or even more, this means that a very strong transmission signal is transmitted by the mobile communication unit via the related antenna 106 and reaches the neighbouring antenna 108 of the positioning system receiver unit 102. This leads to a relatively strong and undesired interfering signal that changes the reception behaviour in the positioning system receiver 102.

Figure 2:
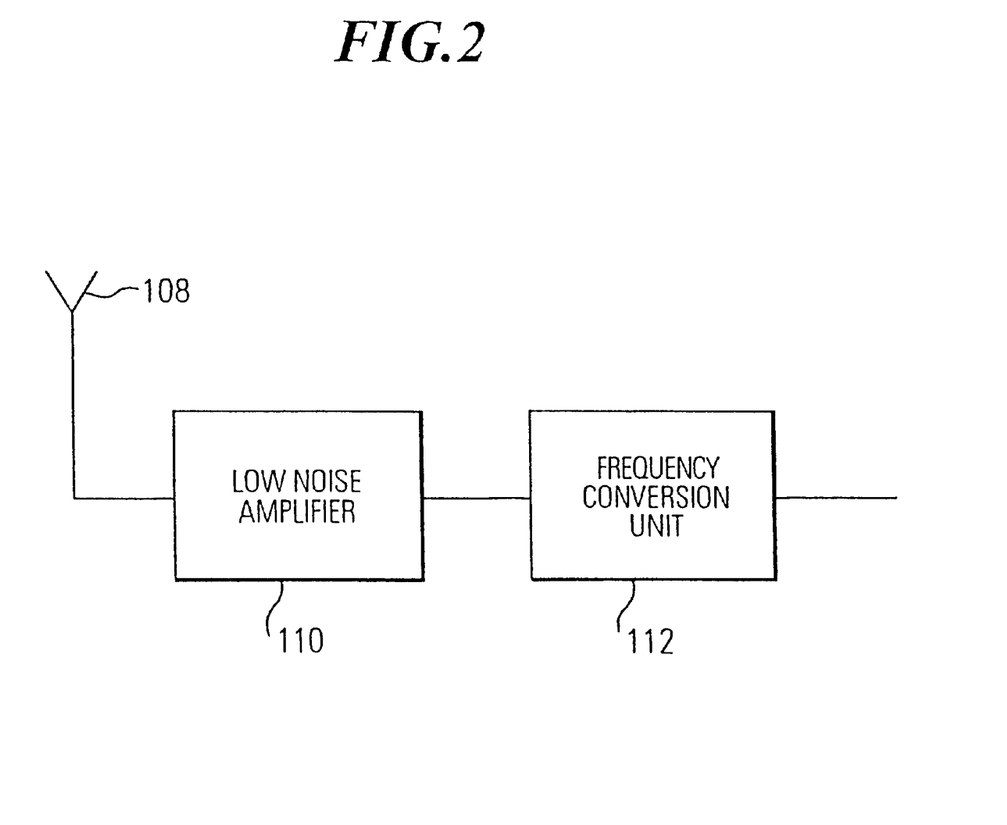
FIG. 2 shows a schematic diagram of the first elements of the global positioning system receiver unit, shown in FIG. 1.

As shown in FIG. 2, the first elements of the receiver part of the positioning system receiver unit 102 consists of an antenna 108, a low noise amplifier 110 and a subsequent frequency conversion unit 112. In case a strong interfering signal is received via the antenna 108 of the positioning system receiver unit 102, this interfering signal changes the operation point of the low noise amplifier 110 in the positioning system receiver 102 and thus deteriorates the gain and noise figure for the desired incoming positioning system localization signal which itself is already very weak, i.e. below −120 dBm.

Another source for the occurence of interferences may be the radiation of interfering signals from any part of the transmitter. These interference signals may be received via any line segment of the positioning system receiver.

The positioning system receiver thus gets "blind" for the weak positioning system localization signal or—in other words—the sensitivity of the positioning system receiver for the localization signal is decreased significantly during transmission time periods of the mobile phone 104. This in conclusion means that the positioning functionality of the positioning system receiver 102 is severely affected.

SUMMARY OF INVENTION

In view of the above the object of the present invention is to compensate for any interference from a mobile communication system unit to a positioning system receiver unit in a multiple standard communication device with mobile communication and localization functionality.

Therefore, according to the present invention, it is proposed to branch off, e.g., with any type of coupling device, a part of the transmitted output signal in a second sub-unit before the antenna. The branched-off is attenuated/amplified and phase-shifted in such a way that it has a magnitude and sign/phase to compensate for interference caused by unwanted signal at the input of a superposition unit in the receiver part of a first sub-unit for receiving weak signals. Therefore, interfering signal compensation is achieved through superposition of the interfering signal with the attenuated amplified and phase-shifted branched-off output signal.

According to a preferred embodiment of the present invention the input signal is the input signal of a positioning system receiver unit for localization purposes and the output signal is a transmission signal of a mobile phone unit. Preferably, the input signal may be of the global positioing type and the transmission signal may be of the GSM type. Also, the present invention is as well suited for application to a dual mobile communication standard, e.g, GSM 900/GSM 1800 or GSM 900/GSM 1900.

Since in the superposition unit both the desired positioning system localization signal superposed with an interferer signal from the mobile communication system and the phase-shifted and attenuated branched-off transmitter signal are superposed, the disturbing component in the reception signal of the positioning system receiver unit ideally may be cancelled out in full so that the positioning system receiver unit remains fully operational also during transmission operation of the mobile communication unit. Therefore, the localization functionality of the mobile device is ensured also during time periods of transmission for the mobile communication unit.

According to a preferred embodiment of the present invention, the attenuation/amplification and phase-shifting is also carried out to compensate for time-variant external influences through minimizing the signal at the output of the superposition unit when the phase difference is modified in a range between 0 and $2\pi$ in the phase-shifter and the magnitude is attenuated and amplified.

Therefore, this approach achieves a minimum disturbance level at the output of the superposition unit irrespective of whether the interfering signal is initiated through the mobile communication unit or received from external sources operating at the same transmission frequency as the internal communication unit via the antenna of the positioning system receiver unit. Also, in case of multiple disturbance sources, the minimum disturbance level in the positioning system receiver is maintained.

The signal at the output of the superposition unit is used as a basis for interference compensation. Therefore, the parasitic inductance and capacitance of line segments between, e.g., the power amplifier of the mobile communication unit to the branched-off unit and further line segments between the positioning system antenna and the superposition unit as well as the parasitic circuit elements according to the connections to the controllable attenuator and phase-shifter are taken into account so that no disturbances are introduced at the positioning system receiver unit through the error compensation itself.

The iterative shifting of the phase between 0 and $2\pi$ and of the amplitude is implemented by software code portions running on a processor unit for performing the necessary iterative steps. These software code portions are integrated into a computer program product directly loadable into the internal memory of the processor unit when the computer program product is run on the processor unit.

Preferably the computer program product may be stored on a computer usable storage medium comprising the computer-readable software code portions for performing the inventive subtraction method when the computer program product is run on the processor unit.

Therefore, using this flexible implementation of the present invention it is possible to easily modify iterative strategies to achieve the minimum disturbing signal at the output of the superposing unit without any modification of the hardware structure underlying the receiver apparatus according to the present invention.

Also, the inventive superposition method stored on the computer-usable storage medium may be easily transferred to a plurality of receiver apparatus, e.g., after a modification to achieve a update of the receiver apparatus functionality again without any receiver apparatus hardware modifications.

BRIEF DESCRIPTION OF DRAWING

In the following preferred embodiments of the present invention will be described with reference to the drawing in which.

DESCRIPTION OF PREFERRED EMBODIMENTS

Figure 3:
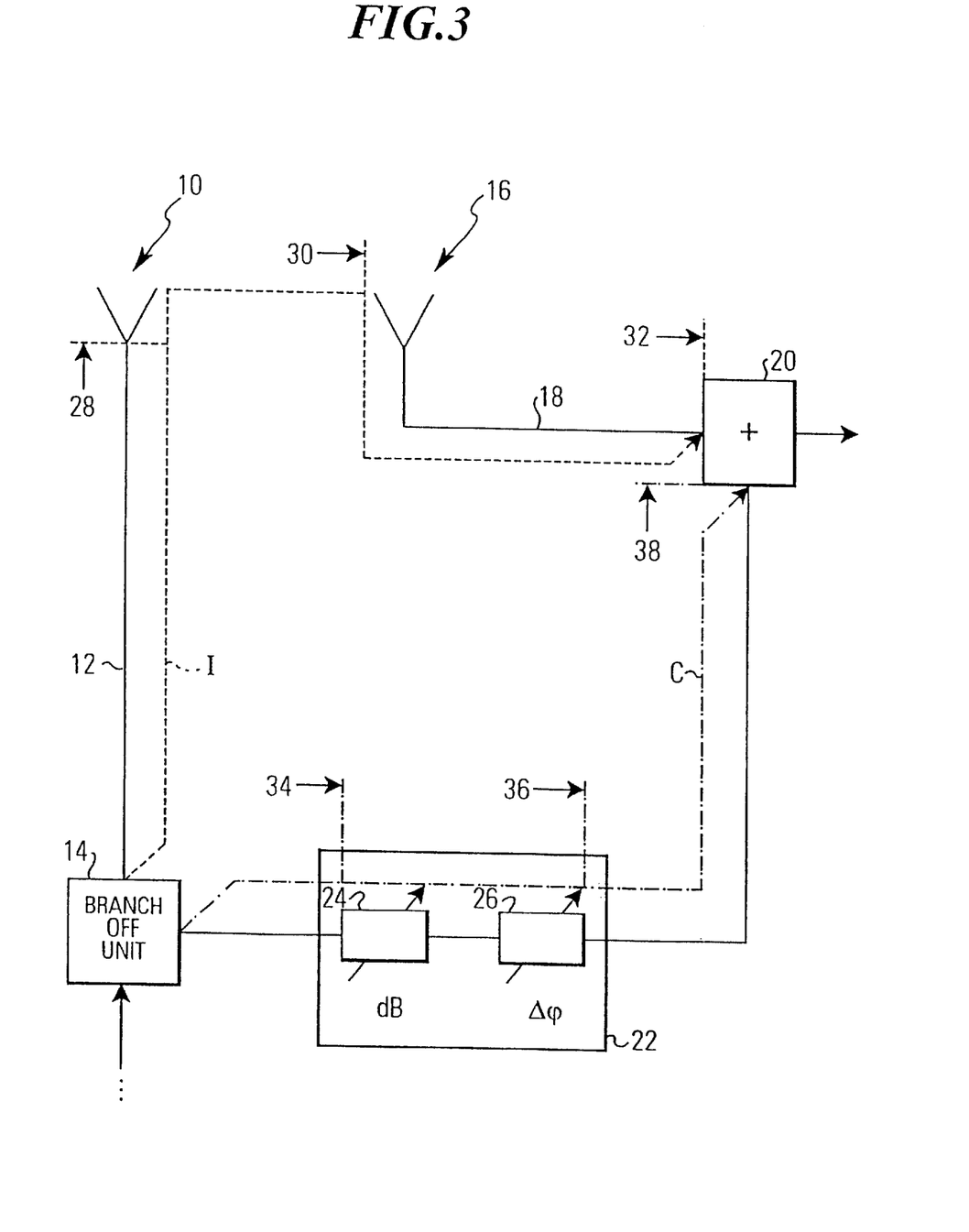
FIG. 3 shows a schematic diagram illustrating the interference cancellation arrangement according to the present invention.

As shown in FIG. 3, the basic approach underlying the interference cancellation according to the present invention relies on a transmitter output signal supplied by a mobile phone transmitter to an antenna 10 of the mobile phone along a mobile phone antenna line 12. In the mobile phone antenna line 12 there is provided a branch-off unit 14 to be discussed in more detail in the following.

As also shown in FIG. 3, the signal transmitted via the mobile phone antenna 10 also reaches a positioning system antenna 16 as interfering input signal which is further propagated via a positioning system receiver line 18 to a superposition unit 20. Thus, the superposition unit 20 may, e.g., either carry out an addition or subtraction for the signals supplied thereto if the relative phase difference of these signals is determined appropriately.

As also shown in FIG. 3, the branch-off unit 14 is provided to branch off a part of the mobile phone transmitter signal for supply to a interference suppression unit 22. The interference suppression unit 22 comprises a controllable attenuator/amplifier 24, in the following also referred to as attenuator, and a controllable phase-shifter 26. Thus, the branched-off part of the transmitter signal is supplied to the controllable attenuator 24 and the controllable phase-shifter 26 and thereafter the resulting signal is further supplied to the superposition unit 20 for superposition onto the further signal received by the superposition unit 20 via the positioning system antenna 16 and the positioning system receiver line 18.

The operation of the interference cancellation unit according to the present invention and shown in FIG. 3 will now be discussed.

Figure 5:
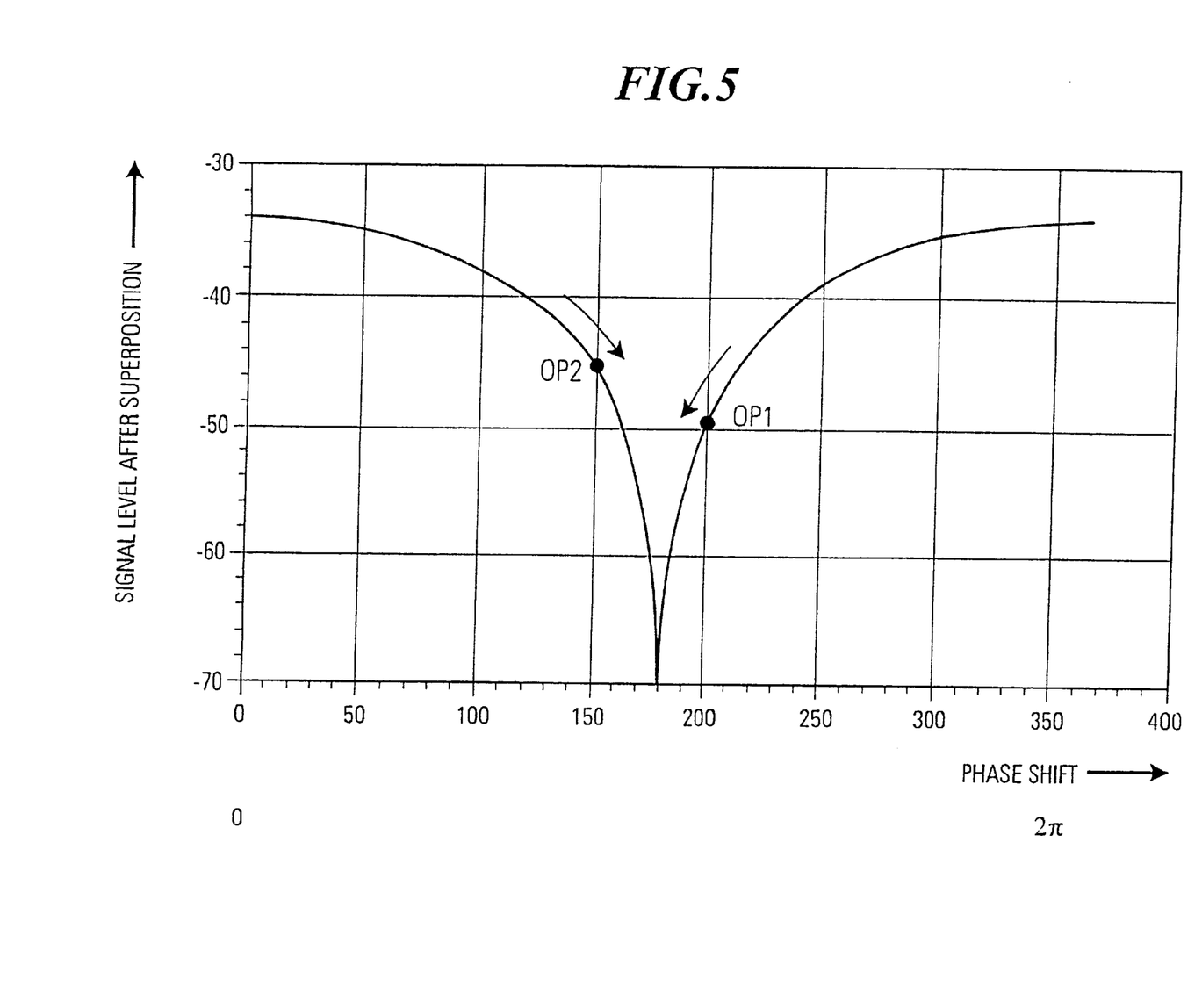
FIG. 5 shows the result of a superposition of two signals with an equal amplitude depending on variable phase difference.

The transceiver signal supplied to the branched-off unit 14 is split therein into a major part that is further supplied to the mobile phone antenna 10 and a branched-off part that is supplied to the interference cancellation unit 22. Therefore, in case the transmitter signal of the mobile phone is received by the positioning system antenna 16 as interfering signal and then further supplied via the positioning system receiver line 18, it is possible to take countermeasures against this interfering signal in case the output of the interference cancellation unit 22 and the positioning system receiver line 18 are both connected to the superposition unit 20. In particular, the controllable attenuator 24 and the controllable phase-shifter 26 of the interference cancellation unit 22 are tuned such that at the output of the superposition unit 20 the signal level is minimum, as shown in FIG. 5.

The reason for this is as follows: Since a mobile phone unit and a positioning system receiver unit are operated in parallel in a communication device and the signal level of the mobile phone transmission signal is usually much higher than the signal level of a desired positioning system localization signal any interfering signal received in general by the positioning system antenna 16 will always dominate a desired positioning system reception signal. In other word, unless the output signal of the superposition unit 20 has not minimum amplitude it may be concluded that still an interfering share of the mobile phone transmission signal received as interfering signal via the positioning system antenna 16 is comprised therein. Only when the output level at the superposition unit 20 becomes a minimum it is clear that no longer an interference signal with much higher signal level according to the mobile-phone transmission signal is comprised therein.

As also shown in FIG. 3, the signal paths leading to the superposition unit 20 are the interfering signal path I shown as dash-line in FIG. 3 and further a compensation path C shown as dash-dot-line in FIG. 3.

Further, the interference path subdivides into a first part starting at the output at the branch-off unit 14 and leading to the mobile phone antenna at position 28, further a second part between the position 28 and the positioning system antenna 16, i.e. between position 28 and position 30, and further a third part between the positioning system antenna 16 according to position 30 and the input to the superposition unit 20 according to position 32.

Further, also the compensation path splits into three parts, i.e. the first part leading between the branch-off unit 14 and the input to the controllable attenuator 24 according to position 34, further the second part between position 34 at the input of the interference cancellation unit 22 and position 36 at the output of the controllable phase-shifter 26, and finally a third part between the output of the controllable phase-shifter 26 and the input to the superposition unit 20 according to position 38.

Here, it should be noted that according to the present invention the point is not to exactly determine the attenuation and phase-shift of each different part in the interference path I and the compensation path C but only to achieve a minimum output level of the superposition unit. For this reason, the interference cancellation unit 22 as well as the branch-off unit 14 may be freely inserted at any suitable position as long as the controllable attenuator 24 and the controllable phase-shifter 26 therein minimize the signal level at the output of the superposition unit 20. Preferably, the superposition unit 20 is located as close as possible to the input of the low noise amplifier of the positioning system.

In other words, according to the present invention no absolute values of path segment attenuation and phase-shift are determined but only the relative attenuation and phase-shift properties of the compensation path C relative to the interference path I is modified through the provision of a controllable attenuator 24 and a controllable phase-shifter 26, respectively. Therefore, the actual position of the branch-off unit 14 as well as the interference cancellation unit 22 and the course of the cancellation path C is irrelevant since in case the attenuation/amplification and phase-shift of the first compensation part leading to position 34 is modified and therefore also the attenuation/amplification and phase-shift of the third compensation part between position 36 and 38 the only means that another tuning of the controllable attenuator 24 and the controllable phase-shifter 26 is necessary to again achieve minimum signal level at the output of the superpositioning unit 20.

Therefore, according to one embodiment of the present invention interference cancellation is achieved as long as the interference cancellation unit 22 leads to a 180° phase-shift between the transmission signal propagated along the interference path I and the transmission signal propagated along the compensation path C. Further the attenuation/amplification should be selected such that the impact of the interference signal onto the positioning system receiver signal is minimized.

As also shown in FIG. 3, according to the present invention propagation does not only occur along circuit lines but also between the mobile phone antenna 10 and the positioning system antenna 16. While the actual determination of characteristic parameters in particular of the air path would require an increased measurement effort and thus lead to increased costs according to the present invention interference compensation is achieved without actual knowledge of specific attenuation and phase shift values.

Further, the inventive approach allows not only to consider the interference path itself but also influences like temperature and frequency dependencies and additional strong signal reflections close to the communication unit which by itself require compensation mechanisms.

In the following, a flowchart according to the inventive superpositioning method to achieve interference cancellation at the positioning system receiver will be explained with reference to FIG. 4.

Figure 4:
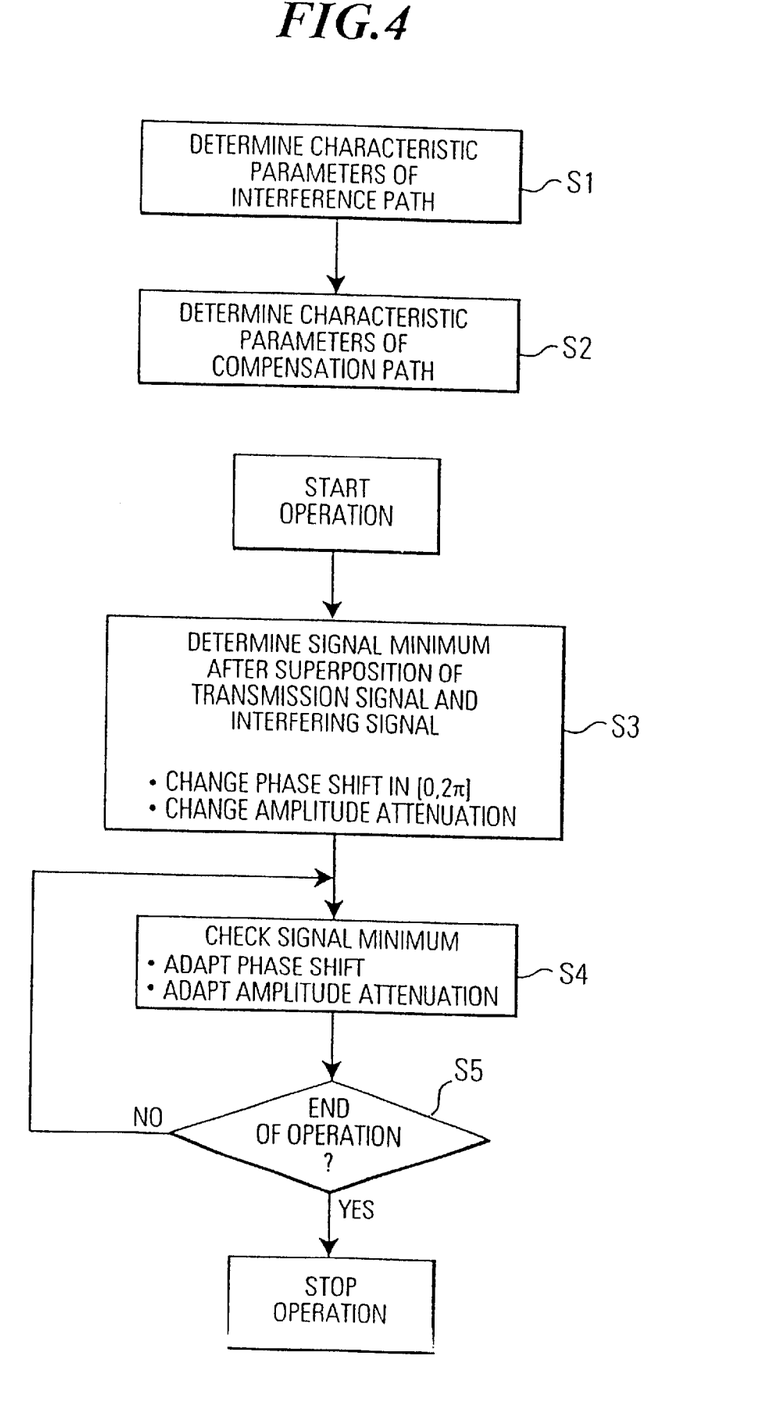
FIG. 4 shows a flowchart for the iterative interference cancellation method according to the present invention.

As shown in FIG. 4, the inventive interference cancellation approach may be considered as being divided into two parts, i.e. one being carried out before the actual operation of the communication device and the other being continuously carried out during the operation thereof.

As shown in FIG. 4, before the actual operation of the communication device, i.e. the parallel operation of the mobile phone unit and the positioning system unit, it is possible to carry out the minimization of the output signal of the superposition unit during a test operation for a prototype of the communication device.

Therefore, according to the present invention the basic characteristics of the interference path, in particular the attenuation and the phase-shift thereof are determined using a prototype of the communication device. Also, characteristic attenuation and phase-shift parameters of the compensation path may be measured using the communication device prototype.

As a result of these pre-operative measurement steps S1 and S2, shown in FIG. 4, it is possible to achieve basic setting or adjustment values for the controllable attenuator 24 and the controllable phase-shifter 26. Thus, the present invention takes into account that the direct coupling between the mobile phone antenna 10 and the positioning system antenna 16 dominates, further secondary phenomena like multiple path propagation or reflection or external noise superposition.

The characteristic attenuation and phase-shift parameters of the interference path I and the compensation path C determined during steps S1 and S2 are then used for the operation of the inventive interference cancellation unit 22 after the start of operation of the communication device.

As shown in FIG. 4, after start of operation of the communication device initially a signal minimum at the output of the superposition unit 20, shown in FIG. 3, is determined. Here, the characteristic parameters determined in steps S1 and S2 for the interference path and compensation path may be used.

Then, initially the phase may be shifted from the characteristic phase-shift parameter of the compensation path both to higher and lower values. In case one of these amendments leads to a lower signal at the output of the superposition unit the prevailing output signal at the superposition unit 20 is not minimum so that the phase-shift is further tuned along the direction where the signal level at the output of the superposition unit 20 is decreasing. As shown in FIG. 4, in an extreme case this may lead to a scan of the phase range between 0 and $2\pi$.

As also shown in FIG. 4, after the tuning of the phase shift there follows the tuning of the amplitude attenuation/ amplification in the interference cancellation unit 20 with the phase-shift being fixed to the value where the output of the superposition unit 20 has been minimum. Here, the amplitude attenuation is increased and decreased to detect whether the signal level at the output of the superposition unit 20 having minimum value after phase-shift tuning may be further reduced. If this is the case, the attenuation of the controllable attenuator 24 of the interference cancellation unit 22 is amended to further decrease the signal level at the output of the superposition unit 20.

As also shown in FIG. 4, according to step S3 the steps to change the phase-shift and amplitude attenuation are carried out in a sequential or equivalently successive manner. The reason for this is that the overall modification of the attenuation and phase along the compensation path for a specified transmission frequency may be described through a complex number having amount and phase so that both values may be optimized independently. Therefore, while according to step S3 shown in FIG. 4 the sequence is phase-shift tuning and then amplitude attenuation tuning the sequence may as well be reversed or be determined to phase-shift tuning, amplitude attenuation tuning, again phase-shift tuning, etc.

The last sequence takes into account that a tuning of the attenuator also implies a slight phase shift due to non-ideal characteristics of the attenuator. Also, a tuning of the phase shifter implies a slight change in amplitude due to the non-ideal characteristic of the phase shifter. Therefore, a further additional phase shift and amplitude tuning might be necessary to achieve optimal results.

As also shown in FIG. 4, after the initial determination of the signal minimum at the output of the superposition unit 20 during operation of the communication device the signal minimum is repeatedly checked in step S4. Heretofore, the phase-shift previously determined for a minimum signal level at the output of the superposition unit 20 is slightly modified to see whether a further decrease in signal level may be achieved, e.g., due to modified operation conditions and attenuation between the mobile phone antenna 10 and the positioning system antenna 16. If this is the case, the phase-shift is further adapted to the amended operative conditions to further minimize the signal level at the output of the superposition unit 20. The same holds true for the amplitude attenuation in the interference cancellation unit 22. Again, while for step S4 shown in FIG. 4 a sequence is defined phase-shift tuning and then amplitude attenuation tuning the sequence may well be reversed or be selected to phase-shift tuning, amplitude attenuation tuning, again phase-shift tuning, etc.

As also shown in FIG. 4, after step S4 the end of operation of the communication.device is checked in step S5 and then the checking of the signal minimum at the output of the superposition unit 20 is again repeated in step S4 until the overall operation of the communication device is stopped.

FIG. 5 shows the result of superpositioning depending on a phase difference between the interfering signal received via the positioning system antenna 16 and the branched-off transmitter signal propagated over the compensation path C and the interference compensation unit 22.

As shown in FIG. 5, in case a specific operative point OP1 or OP2 is given during the operation of the communication device, a modification of the phase-shift may either lead to an increase or a decrease of the resulting signal level at the output of the superposition unit. Therefore, as already explained with respect to FIG. 4, a phase-shift may initially be slightly modified to derive a direction change for the phase-shift along which the signal level is decreasing. For the example shown in FIG. 5 assuming a start position of, e.g., 200° for operative point OP1, the direction of amendment would be towards a lower value of phase-shift on the other hand, in case the starting position is below 180°, e.g., 150° for operative point OP2, the phase-shift would have to be increased so as to lower the signal level after superposition. Further, since the signal received via the positioning system antenna 16 also comprises localization signal components at the output of the superposition unit 20, the signal level will never reach the level of zero but ideally a level according to the positioning system localization signal level to be expected without interference phenomena.

Figure 6:
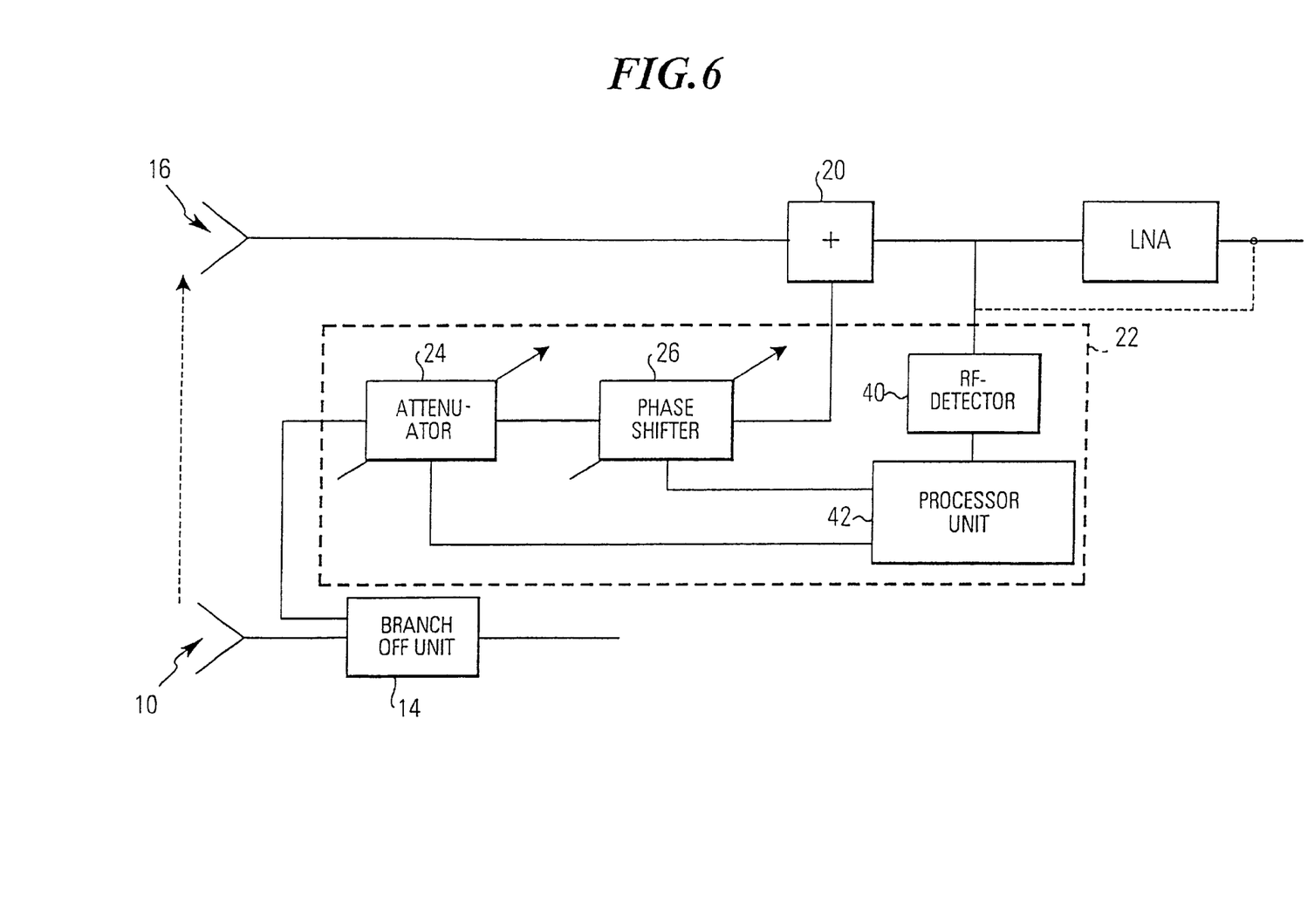
FIG. 6 shows a schematic diagram according to the iterative procedure for interference cancellation according to the present invention.

FIG. 6 shows a block diagram of the interference cancellation unit 22 according to the present invention. In FIG. 6 the same corresponding circuit elements as already shown in FIG. 3 are denoted using the same reference numerals and the repeated explanation thereof will be omitted.

In addition to the elements shown in FIG. 3, FIG. 6 also shows at the output of the superposition unit 20 a low noise amplifier of the positioning system receiver unit.

As also shown in FIG. 6, the interference cancellation unit 22 according to the present invention comprises a RF-detector 40 connected to the output of the superposition unit 20. The output signal of the RF-detector 40 is submitted to a processor unit 42 that controls the controllable attenuator 24 and the controllable phase-shifter 26. While according to the interference cancellation unit 22 shown in FIG. 6 there is provided an RF-detector 40, it is also possible to use either the output of the low noise amplifier or a signal of the frequency conversion unit 112—shown in FIG. 2 with respect to prior art but being as well applicable to the present invention—as indication of the signal strength at the output of the superposition unit 20.

Operatively, in the interference cancellation circuit 22 shown in FIG. 6 the processor unit 42 carries out the steps of the iterative subtraction method discussed above with respect to FIG. 4. Further, the characteristic parameters for attenuation and phase-shift according to the interference path and detected at a communication device prototype may be submitted to the processor unit 42 before the actual operation of the communication device.

Further, due to the fact that the isolation between the mobile phone antenna 10 and the positioning system antenna 16 represents a high attenuation value according to 30 to 40 dB, the absolute insertion loss of the controllable phase-shifter 26 is not too critical. However, the variation of the attenuation versus the phase-shift in the controllable attenuator 24 is more critical due to the subsequent superposition in the superposition unit 20 and thus should be as low as possible. Also, the variation in phase of the controllable attenuator 24 must be kept as low as possible for the same reason.

Further, the branch-off unit 14 shown in FIG. 6 may have a rather high coupling value of 15 dB so as to influence the transmission path to the mobile phone antenna 10 only marginally. Further, the superposition unit 20 as additional component in the positioning system receiver path should also have a very low insertion loss for the localization signal coming from the positioning system antenna 16 while the same path may have a quite high loss for the interfering transmission signal of the mobile phone.

Further, it should be noted that operatively the interference cancellation unit 22 shown in FIG. 6 may also handle a situation where strong reflecting obstacles, e.g., large metallic surfaces exist close to the communication unit that reflect mobile transmission signals back to the positioning system antenna 16. In this case, too, undesired interfering signals may reach the positioning system antenna 16. Nevertheless, the resulting interfering signal may be considered as an overall superposed interfering signal and thus be handled according to the same principles as outlined above since all components of the interfering signals have the same frequency.

What is claimed is:

1. A mobile communication device, comprising:
   a first sub-unit for receiving input signals at a predetermined input level;
   a second sub-unit including an antenna for transmitting output signals at an output level that is large compared to said input level of said first sub-unit;
   a branch off unit adapted to branch off a part of said output signal before said antenna of said second sub-unit; and
   an interference suppression unit adapted to receive said branched off part of said output signal and to derive an interference compensation signal therefrom through attenuation and subsequent phase shifting for subsequent supply to a superposition unit which is adapted to receive said input signal of said first sub-unit;
   wherein said first sub-unit is a positioning system receiver unit for receiving a signal for a localization,
   said second sub-unit is a mobile communication system unit for outputting a transmission signal according to a related communication standard, and
   said interference suppression unit includes:
      a controllable attenuator tunable according to said attenuation/amplification of said output signal after branch off between said branch off unit and said superposition unit; and
      a controllable phase shifter tunable according to said phase shift of said output signal after branch off between said branch off unit and said superposition unit such that said signal level at said output of said superposition unit is minimized,
      wherein one or both of said controllable attenuator and said controllable phase shifter are tuned to compensate for time variant external influences through minimizing said signal level at the output of said superpositioning unit using a signal strength indicator implemented using a detector diode at the input of the first sub-unit.

2. The mobile multiple standard communication device according to claim 1, said first sub-unit is a global positioning system (GPS) receiver and that said second sub-unit outputs two transmission signals according to the dual band mobile communication standard GSM 900/GSM 1900.

3. The mobile multiple standard communication device according to claim 1, wherein the signal strength indicator is integrated into a first element of said positioning system receiver.

4. A mobile communication device, comprising:
   a first sub-unit for receiving input signals at a predetermined input level;
   a second sub-unit including an antenna for transmitting output signals at an output level that is large compared to said input level of said first sub-unit;
   a branch off unit adapted to branch off a part of said output signal before said antenna of said second sub-unit; and
   an interference suppression unit adapted to receive said branched off part of said output signal from said branch off unit and to derive an interference compensation signal therefrom through attenuation and subsequent phase shifting for subsequent supply to a superposition unit which is adapted to receive said input signal of the first sub-unit;
   wherein said first sub-unit is a positioning system receiver unit receiving a signal for a localization,
   said second sub-unit is a mobile communication system unit outputting at least one transmission signal according to a related communication standard, and
   said interference suppression unit comprises:
      a controllable attenuator tunable according to said attenuation/amplification of said output signal after branch off between said branch off unit and said superposition unit;
      a controllable phase shifter tunable according to said phase shift of said output signal after branch off between said branch off unit and said superposition unit such that said signal level at said output of said superposition unit is minimized, and
      a processor unit adapted to iteratively tune one or both of said controllable attenuator and said controllable phase shifter (26) such that said signal at the output of said superpositioning unit (20) is minimal when the phase difference is swept in a range of (0, 2π).

5. A superposition method for compensation of an interference signal in a mobile multiple standard communication device, comprising:
   branching off a part of an output signal before an antenna of a second sub-unit; and
   receiving the branched off part of said output signal and deriving a positioning system interference compensation signal in a first sub-unit therefrom through attenuation and phase shifting for subsequent superposition onto an input signal of said first sub-unit by tuning a controllable attenuator according to said attenuation/amplification of said output signal after branching off and subsequent superposition onto said input signal and tuning a controllable phase shifter according to said phase shift of said output signal after branching off and subsequent superposition onto said input signal of the first sub-unit such that a signal level after superposition is minimized;
   wherein said input signal is an input signal of a positioning system for localization, and wherein said tuning of one or both of said controllable attenuator and said controllable phase shifter is carried out such that said signal after superpositioning is minimal when said phase difference is swept in a range of (0, 2π).

6. The superpositioning method according to claim 5, wherein said output signal is a transmission signal of a mobile communication unit.

7. The superposition method according to claim 5, wherein one or both of said controllable attenuator and said controllable phase shifter are tuned to compensate for time variant external influences through minimizing said signal after superpositioning using a signal strength indicator.

8. A superposition method for compensation of an interference signal in a mobile multiple standard communication device, comprising:

branching off a part of an output signal before an antenna of a second sub-unit;

receiving the branched off part of said output signal and deriving a positioning system interference compensation signal in a first sub-unit therefrom through attenuation and phase shifting for subsequent superposition onto an input signal of said first sub-unit, wherein said input signal is an input signal of a positioning system for localization; and determining characteristic parameters of an interference path between a branched-off unit and a superposition unit and a compensation path running between said branched-off unit, a controllable attenuator, a controllable phase-shifter, and said superposition unit before said operation of said mobile unit.

* * * * *